JOHNSTON D. CURL AND JOHN G. BARTLETT, OF MOKENA ILLINOIS.

*Letters Patent No. 89,562, dated May 4, 1869.*

IMPROVED MEDICAL COMPOUND.

The Schedule referred to in these Letters Patent and making part of the same.

Be it known that we, JOHNSTON D. CURL and JOHN G. BARTLETT, of Mokena, in Will county, and State of Illinois, have invented a new and improved Ointment for the Treatment of such Diseases as Salt-Rheum, Scald-Head, Fever-Sores, &c.; and we do hereby declare the following to be a full, clear, and exact description of the ingredients and the proportions and mode of combining the same, which is as follows:

We take two pounds of lard, to which we add one-half pound of the bark of bitter-sweet root and one-half pound of balm of Gilead buds, which are stewed down together for about thirty minutes, and then the sediment strained out. We then add two ounces of quicksilver, dissolved in two ounces of nitric acid, one ounce of spirits of turpentine, and one ounce of balsam of fir. The whole mixture is then heated over a slow fire for about twenty to thirty minutes, until the whole is thoroughly melted, after which it is taken off the fire and stirred until cold.

The ointment may be used for all kinds of inflammatory diseases, such as rheumatism, scald-head, burns, salt-rheum, &c., and is applied externally, by rubbing it on the afflicted part, as any ordinary ointment.

Claim.

Having thus described our invention,
What we claim as new, and desire to secure by Letters Patent, is—

The combination of the ingredients described, in the manner and proportion as and for the purposes set forth.

JOHNSTON D. CURL.
JOHN G. BARTLETT.

Witnesses:
THOS. H. HUTCHINS,
H. LOWE.